United States Patent
Fujino

(10) Patent No.: US 10,941,236 B2
(45) Date of Patent: Mar. 9, 2021

(54) OPTICAL FILM AND POLARIZING PLATE

(71) Applicant: ZEON CORPORATION, Tokyo (JP)

(72) Inventor: Yasuhide Fujino, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 43 days.

(21) Appl. No.: 15/772,880

(22) PCT Filed: Nov. 14, 2016

(86) PCT No.: PCT/JP2016/083670
§ 371 (c)(1),
(2) Date: May 2, 2018

(87) PCT Pub. No.: WO2017/086265
PCT Pub. Date: May 26, 2017

(65) Prior Publication Data
US 2018/0312622 A1    Nov. 1, 2018

(30) Foreign Application Priority Data

Nov. 18, 2015   (JP) .............................. JP2015-225636

(51) Int. Cl.
*C08F 297/04*    (2006.01)
*G02B 5/30*    (2006.01)
*C08J 5/18*    (2006.01)
*G02F 1/1335*    (2006.01)
*G02B 1/14*    (2015.01)

(52) U.S. Cl.
CPC ........ *C08F 297/046* (2013.01); *C08F 297/04* (2013.01); *C08J 5/18* (2013.01); *G02B 1/14* (2015.01); *G02B 5/30* (2013.01); *G02B 5/3025* (2013.01); *G02F 1/1335* (2013.01); *C08F 2800/20* (2013.01); *C08J 2323/06* (2013.01); *C08J 2323/20* (2013.01); *C08J 2353/02* (2013.01); *G02F 1/133528* (2013.01)

(58) Field of Classification Search
CPC ..... C08F 297/046; C08F 2800/20; C08J 5/18; C08J 2353/02; G02B 1/14; G02B 5/3025; G02F 1/133528
See application file for complete search history.

(56) References Cited

U.S. PATENT DOCUMENTS

| | | | | |
|---|---|---|---|---|
| 2003/0207983 A1* | 11/2003 | Sone | ..................... | C08F 297/04 524/505 |
| 2004/0077795 A1* | 4/2004 | Hashizume | ............... | C08F 8/04 525/338 |
| 2009/0202822 A1* | 8/2009 | Hasegawa | ................ | C08J 7/047 428/339 |
| 2011/0038045 A1 | 2/2011 | Zhou et al. | | |

FOREIGN PATENT DOCUMENTS

| | | |
|---|---|---|
| CN | 101454697 A | 6/2009 |
| EP | 1278079 A1 | 1/2003 |
| EP | 1310513 A1 | 5/2003 |
| JP | 2003114329 A | 4/2003 |
| JP | 2006243266 A | 9/2006 |
| JP | 2007316366 A | 12/2007 |
| JP | 2008052002 A | 3/2008 |
| JP | 2009227905 A | 10/2009 |
| JP | 2011013378 A | 1/2011 |
| JP | 2011523668 A | 8/2011 |
| JP | 2012133377 A | 7/2012 |
| JP | 2017134305 A | 8/2017 |
| WO | 0077095 A1 | 12/2000 |
| WO | 0212362 A1 | 2/2002 |
| WO | 2007138850 A1 | 12/2007 |
| WO | 2009137278 A1 | 11/2009 |

OTHER PUBLICATIONS

Feb. 7, 2017, International Search Report issued in the International Patent Application No. PCT/JP2016/083670.
Jul. 4, 2019, the Extended European Search Report issued by the European Patent Office in the corresponding European Patent Application No. 16866267.4.
May 22, 2018, International Preliminary Report on Patentability issued in the International Patent Application No. PCT/JP2016/083670.
Dec. 30, 2019, Office Action issued by the China National Intellectual Property Administration in the corresponding Chinese Patent Application No. 201680062733.5.

* cited by examiner

*Primary Examiner* — Bijan Ahvazi
(74) *Attorney, Agent, or Firm* — Kenja IP Law PC

(57) ABSTRACT

An optical film having a heat resistance of 120° C. or higher, a tear strength of 1.5 N/mm or more, a water vapor transmission rate of 50 g/m²·day or less, and having absolute values |Re| and |Rth| of an in-plane retardation Re and a thickness-direction retardation Rth each being 1 nm or less; and a polarizing plate having the same. Preferably, the optical film includes a polymer containing a block A having the unit (a) of the hydrogenated product of the aromatic vinyl compound; and a copolymer block B having the unit (a) of the hydrogenated product of the aromatic vinyl compound and the unit (b) of the hydrogenated product of the diene compound.

5 Claims, No Drawings

OPTICAL FILM AND POLARIZING PLATE

FIELD

The present invention relates to an optical film and a polarizing plate, and in particular, to an optical film suitably used for a film for protecting a polarizer in a polarizing plate, and a polarizing plate including such an optical film.

BACKGROUND

Display devices such as liquid crystal display devices are equipped with various optical films. For example, a liquid crystal display device usually includes a polarizing plate. Such a polarizing plate usually includes a polarizer constituted by a resin such as a polyvinyl alcohol, and a protective film for protecting the polarizer. Various materials have been proposed as the material of the protective film. For example, use of a block copolymer containing a block of a hydrogenated product of an aromatic vinyl compound and a block of a hydrogenated product of a diene compound has been proposed (Patent Literature 1).

CITATION LIST

Patent Literature

Patent Literature 1: Japanese Patent Application Laid-Open No. 2011-13378 A

SUMMARY

Technical Problem

Various properties are required for such a protective film of a polarizing plate. For example, the protective film is required to have durability whereby occurrence of defects can be avoided during the production process of display devices, even when the film has a thin thickness. Furthermore, the protective film needs to be capable of constituting display devices with less deterioration of display qualities in use. For example, when a display device is used, the polarizing plate may be deformed to lead to light leakage and in turn deterioration of the display qualities of the display device displaying black image. There is a demand for solving such a problem.

Accordingly, an object of the present invention is to provide an optical film and a polarizing plate that can have durability whereby occurrence of defects can be avoided during the production process of display devices even when the film has a thin thickness, and can constitute a display device with less deterioration of display qualities in use.

Solution to Problem

To solve the aforementioned problems, the present inventor has conducted studies. As a result, the present inventor found that a particular optical film can solve the aforementioned problems, the optical film having specific heat resistance, tear strength, and water vapor transmission rate and having specific absolute values of an in-plane retardation Re and a thickness-direction retardation Rth.

The present inventor has further found that the aforementioned optical film can be produced using a material containing a polymer having specific units.

The present invention has been completed on the basis of the aforementioned knowledge.

Specifically, the present invention provides the following [1] to [9].

(1) An optical film having a heat resistance of 120° C. or higher, a tear strength of 1.5 N/mm or more, a water vapor transmission rate of 50 $g/m^2 \cdot day$ or less, and having absolute values |Re| and |Rth| of an in-plane retardation Re and a thickness-direction retardation Rth each being 1 nm or less.

(2) The optical film according to (1), comprising a polymer having a unit (a) of a hydrogenated product of an aromatic vinyl compound and a unit (b) of a hydrogenated product of a diene compound.

(3) The optical film according to (2), wherein
the polymer contains:
a block A having the unit (a) of the hydrogenated product of the aromatic vinyl compound; and
a copolymer block B having the unit (a) of the hydrogenated product of the aromatic vinyl compound and the unit (b) of the hydrogenated product of the diene compound.

(4) The optical film according to (3), wherein
the polymer has a triblock molecular structure having one per one molecule of the copolymer block B and two per one molecule of the block A, the block A being bonded to both ends of the copolymer block B.

(5) The optical film according to (3) or (4), wherein
the polymer has a block A1 and a block A2 as the two blocks A per one molecule, and
a weight ratio A1/A2 of the block A1 to the block A2 is in a range of 40/5 to 70/5.

(6) The optical film according to any one of (2) to (5), wherein a weight ratio (a)/(b) of the unit (a) of the hydrogenated product of the aromatic vinyl compound to the unit (b) of the hydrogenated product of the diene compound in the polymer is in a range of 70/30 to 85/15.

(7) The optical film according to any one of (2) to (6), wherein
the unit (a) of the hydrogenated product of the aromatic vinyl compound is a unit obtained by polymerizing and hydrogenating styrene, and
the unit (b) of the hydrogenated product of the diene compound is a unit obtained by polymerizing and hydrogenating isoprene.

(8) The optical film according to any one of (2) to (7), wherein the polymer has a molecular weight of 80,000 to 150,000.

(9) A polarizing plate comprising: the optical film according to any one of (1) to (8); and a polarizer layer.

Advantageous Effects of Invention

The optical film and the polarizing plate according to the present invention can have durability whereby occurrence of defects can be avoided during the production process of display devices even when the film has a thin thickness, and also can constitute a display device with less deterioration of display qualities in use. In particular, the optical film of the present invention can be suitably used in a liquid crystal display device including a light source and a liquid crystal cell and further having polarizing plates disposed on both the light source and display surface sides of the liquid crystal cell, as a protective film to be located at a position closer to the light source than the polarizer on the displaying surface side.

DESCRIPTION OF EMBODIMENTS

Hereinafter, the present invention will be described in detail with reference to embodiments and examples. However, the present invention is not limited to the following embodiments and examples, and may be freely modified and practiced without departing from the scope of claims of the present invention and the scope of their equivalents.

In the following description, the term "polarizing plate" encompasses not only a rigid member but also a flexible member such as a resin film, unless otherwise stated.

[1. Summary of Optical Film]

The optical film of the present invention has specific heat resistance, tear strength, and water vapor transmission rate and also has specific absolute values |Re| and |Rth| of an in-plane retardation Re and a thickness-direction retardation Rth.

The heat resistance of the optical film of the present invention is 120° C. or higher, and preferably 125° C. or higher. "Heat resistance" of a film herein is a temperature at which the linear expansion of the film is changed by 5% when the film is cut to have a shape of 5 mm×20 mm as a cut sample and the temperature in TMA (thermomechanical analysis) measurement is changed while the sample is applied with a tension of 50 mN in its lengthwise direction. The upper limit of the heat resistance is not particularly limited, but may be 160° C. or lower, for example.

The tear strength of the optical film of the present invention is 1.5 N/mm or more, and preferably 1.6 N/mm or more. The tear strength of a film herein is a value evaluated in accordance with a trouser tear test (JIS K7128-1). The upper limit of the tear strength is not particularly limited, but may be 10 N/mm or less, for example. The unit of the tear strength is N/mm, and the tear strength is an index for evaluation on the basis of a value converted to the film thickness of 1 mm.

The water vapor transmission rate of the optical film of the present invention is 50 g/m²·day or less, and preferably 30 g/m²·day or less. As the water vapor transmission rate, a value measured using a water vapor transmission measurement device ("PERMATRAN-W" manufactured by MOCON Inc.) in accordance with JIS K 7129 B-1992 under the conditions of a temperature of 40° C. and a humidity of 90% RH may be adopted. The lower limit of the water vapor transmission rate is not particularly limited, but may ideally be 0 g/m²·day.

The absolute values |Re| and |Rth| of the in-plane retardation Re and the thickness-direction retardation Rth of the optical film of the present invention are each 1 nm or less, and preferably 0.5 nm or less. The values of Re and Rth may be measured using a phase difference meter (for example, Axoscan manufactured by AXOMETRICS Inc.). The lower limits of the |Re| and |Rth| are not particularly limited, but both are ideally 0. The in-plane retardation Re of the optical film may be determined from in-plane main refractive indices of the optical film nx and ny and thickness d (nm) by Re=|nx−ny|×d. The thickness-direction retardation Rth of the optical film may be determined from in-plane main refractive indices of the optical film nx and ny, refractive index in the thickness direction nz, and thickness d (nm) by Rth=[{(nx+ny)/2}−nz]×d. Re and Rth may be a value relative to light with a wavelength of 590 nm.

When the optical film of the present invention has the aforementioned various properties, the optical film can have durability whereby occurrence of defects can be avoided during the production process of display devices even when the film has a thin thickness and also can constitute a display device with less deterioration of display qualities in use. As a result, the optical film can be advantageously used in various use applications such as a protective film for polarizing plates, and the like. The optical film having the aforementioned various properties may be obtained by adopting a resin containing a polymer X described below as its material.

[2. Unit (a) of Hydrogenated Product of Aromatic Vinyl Compound and Unit (b) of Hydrogenated Product of Diene Compound]

The optical film of the present invention preferably contains a polymer having a unit (a) of a hydrogenated product of an aromatic vinyl compound and a unit (b) of a hydrogenated product of a diene compound. Hereinafter, such a particular polymer may be referred to as a "polymer X". Specifically, the optical film of the present invention may be a film formed from a resin containing the polymer X. When the resin constituting the optical film contains the polymer X, the optical film having the aforementioned various properties can be easily obtained.

[2.1. Unit (a) of Hydrogenated Product of Aromatic Vinyl Compound]

The unit (a) of the hydrogenated product of the aromatic vinyl compound is a repeating unit having a structure obtained by polymerizing an aromatic vinyl compound and hydrogenating unsaturated bonds thereof. However, the unit (a) of the hydrogenated product of the aromatic vinyl compound includes any units obtained by any production method as long as the unit has that structure.

Similarly in the present application, for example, a repeating unit having a structure obtained by polymerizing styrene and hydrogenating its unsaturated bonds may be referred to as a styrene hydrogenated product unit. The styrene hydrogenated product unit also includes any units obtained by any production method as long as the unit has that structure.

Examples of the unit (a) of the hydrogenated product of the aromatic vinyl compound may include a repeating unit represented by the following structural formula (1).

In the structural formula (1), $R^C$ represents an alicyclic hydrocarbon group. Examples of $R^C$ may include cyclohexyl groups such as a cyclohexyl group; and decahydronaphthyl groups.

In the structural formula (1), $R^1$, $R^2$, and $R^3$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group (a halogen atom, an alkoxy group, a hydroxyl group, an ester group, a cyano group, an amido group, an imido group, or a silyl group). In particular, from the viewpoint of heat resistance, low birefringence, and mechanical strength, $R^1$, $R^2$, and $R^3$ are preferably a hydrogen atom or a chain hydrocarbon group of 1 to 6 carbon atoms. As the chain hydrocarbon group, a saturated hydrocarbon group is preferable, and an alkyl group is more preferable.

Specific examples of the unit (a) of the hydrogenated product of the aromatic vinyl compound may include the repeating unit represented by the following formula (1-1). The repeating unit represented by the formula (1-1) is a styrene hydrogenated product unit.

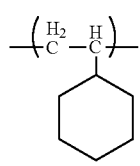
(1-1)

When the exemplified products of the unit (a) of the hydrogenated product of the aromatic vinyl compound include stereoisomers, any of such stereoisomers may be used. As the unit (a) of the hydrogenated product of the aromatic vinyl compound, one type thereof may be solely used, and two or more types thereof may also be used in combination at any ratio.

[2.2. Unit (b) of Hydrogenated Product of Diene Compound]

The unit (b) of the hydrogenated product of the diene compound is a repeating unit having a structure obtained by polymerizing a diene compound, and, if the obtained polymer has unsaturated bonds, hydrogenating the unsaturated bonds. However, the unit (b) of the hydrogenated product of the diene compound includes any units obtained by any production method as long as the unit has that structure.

Similarly in the present application, for example, a repeating unit having a structure obtained by polymerizing isoprene, and hydrogenating its unsaturated bonds may be referred to as an isoprene hydrogenated product unit. The isoprene hydrogenated product unit also includes any units obtained by any production method as long as the unit has that structure.

The unit (b) of the hydrogenated product of the diene compound preferably has a structure obtained by polymerizing a conjugated diene compound such as a linear-chain conjugated diene compound, and hydrogenating the unsaturated bonds thereof. Examples thereof may include a repeating unit represented by the following structural formula (2), and a repeating unit represented by the following structural formula (3).

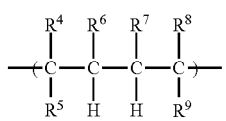
(2)

In the structural formula (2), $R^4$ to $R^9$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group (a halogen atom, an alkoxy group, a hydroxyl group, an ester group, a cyano group, an amido group, an imido group, or a silyl group). In particular, from the viewpoint of heat resistance, low birefringence, and mechanical strength, $R^4$ to $R^9$ are preferably a hydrogen atom or a chain hydrocarbon group of 1 to 6 carbon atoms. As the chain hydrocarbon group, a saturated hydrocarbon group is preferable, and an alkyl group is more preferable.

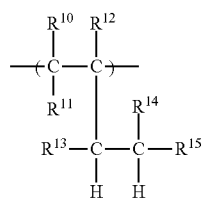
(3)

In the structural formula (3), $R^{10}$ to $R^{15}$ each independently represent a hydrogen atom, a chain hydrocarbon group, a halogen atom, an alkoxy group, a hydroxyl group, an ester group, a cyano group, an amido group, an imido group, a silyl group, or a chain hydrocarbon group substituted with a polar group (a halogen atom, an alkoxy group, a hydroxyl group, an ester group, a cyano group, an amido group, an imido group, or a silyl group). In particular, from the viewpoint of heat resistance, low birefringence, and mechanical strength, $R^{10}$ to $R^{15}$ are preferably a hydrogen atom or a chain hydrocarbon group of 1 to 6 carbon atoms. As the chain hydrocarbon group, a saturated hydrocarbon group is preferable, and an alkyl group is more preferable.

Specific examples of the unit (b) of the hydrogenated product of the diene compound may include repeating units represented by the following formulae (2-1) to (2-3). The repeating units represented by the formulae (2-1) to (2-3) are an isoprene hydrogenated product unit.

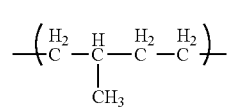
(2-1)

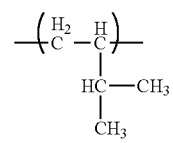
(2-2)

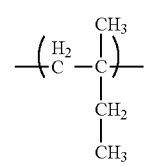
(2-3)

When the exemplified products of the unit (b) of the hydrogenated product of the diene compound include stereoisomers, any of such stereoisomers may be used. As the unit (b) of the hydrogenated product of the diene compound, one type thereof may be solely used, and two or more types thereof may also be used in combination at any ratio.

[3. Polymer X]

It is preferable that the polymer X contains a block A having the unit (a) of the hydrogenated product of the aromatic vinyl compound, and a copolymer block B having the unit (a) of the hydrogenated product of the aromatic vinyl compound and the unit (b) of the hydrogenated product of the diene compound. It is preferable that the polymer X has a triblock molecular structure having one copolymer block B per one molecule and two blocks A per one molecule, the block A being bonded to both ends of the copolymer block B.

In particular, it is preferable that the polymer X having the triblock molecular structure has a block A1 and a block A2 as the two blocks A per one molecule, and the weight ratio A1/A2 of the block A1 to the block A2 is within a specific range. The A1/A2 is preferably 40/5 to 70/5, and more preferably 50/5 to 60/5. When the polymer X has the triblock molecular structure and the A1/A2 is within such a range, the optical film having the aforementioned various properties, in particular, excellent heat resistance can be easily obtained.

It is preferable that, in the polymer X, the weight ratio (a)/(b) of the unit (a) of the hydrogenated product of the aromatic vinyl compound to the unit (b) of the hydrogenated product of the diene compound is within a specific range. The (a)/(b) is preferably 70/30 to 85/15, and more preferably 75/20 to 80/20. When the (a)/(b) is within such a range, the optical film having the aforementioned various excellent properties can be easily obtained. When the (a)/(b) is within such a range, the optical film having a high tear strength and impact strength and low phase difference expression property can be easily obtained.

The molecular weight of the polymer X is preferably 80,000 or more, and more preferably 90,000 or more, and is preferably 150,000 or less, and more preferably 130,000 or less. When the molecular weight is within such a range, in particular is equal to or more than the aforementioned lower limit, the optical film having the aforementioned various properties, in particular, excellent heat resistance can be easily obtained. The molecular weight of the polymer X herein may be a polystyrene-equivalent, weight-average molecular weight determined by GPC using THF as a solvent.

The molecular weight distribution of the polymer X, (weight-average molecular weight (Mw)/number-average molecular weight (Mn)), is preferably 2 or less, more preferably 1.5 or less, and furthermore preferably 1.2 or less. The lower limit of the molecular weight distribution may be 1.0 or more. This can reduce the viscosity of the polymer to enhance the moldability.

The block A is preferably composed only of the unit (a) of the hydrogenated product of the aromatic vinyl compound, but may contain an optional unit other than the unit (a) of the hydrogenated product of the aromatic vinyl compound. Examples of the optional structural unit may include a structural unit based on a vinyl compound other than the unit (a) of the hydrogenated product of the aromatic vinyl compound. The content of the optional structural unit in the block A is preferably 10% by weight or less, more preferably 5% by weight or less, and particularly preferably 1% by weight or less.

The copolymer block B is preferably composed only of the unit (a) of the hydrogenated product of the aromatic vinyl compound and the unit (b) of the hydrogenated product of the diene compound, but may contain an optional unit other than these units. Examples of the optional structural unit may include a structural unit based on a vinyl compound other than the unit (a) of the hydrogenated product of the aromatic vinyl compound. The content of the optional structural unit in the block B is preferably 10% by weight or less, more preferably 5% by weight or less, and particularly preferably 1% by weight or less.

[4. Method for Producing Polymer X]

The method for producing the polymer X is not limited to a particular method, and any production method may be adopted. The polymer X may be produced by preparing monomers corresponding to the unit (a) of the hydrogenated product of the aromatic vinyl compound and the unit (b) of the hydrogenated product of the diene compound, polymerizing them, and hydrogenating the obtained polymer.

As the monomer corresponding to the unit (a) of the hydrogenated product of the aromatic vinyl compound, an aromatic vinyl compound may be used. Examples thereof may include styrenes, such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene, and 4-phenylstyrene; vinylcyclohexanes, such as vinylcyclohexane, and 3-methylisopropenylcyclohexane; and vinylcyclohexenes, such as 4-vinylcyclohexene, 4-isopropenylcyclohexene, 1-methyl-4-vinylcyclohexene, 1-methyl-4-isopropenylcyclohexene, 2-methyl-4-vinylcyclohexene, and 2-methyl-4-isopropenylcyclohexene. As these monomers, one type thereof may be solely used, and two or more types thereof may also be used in combination at any ratio.

Examples of the monomer corresponding to the unit (b) of the hydrogenated product of the diene compound may include chain conjugated dienes, such as butadiene, isoprene, 2,3-dimethyl-1,3-butadiene, 1,3-pentadiene, and 1,3-hexadiene. As these monomers, one type thereof may be solely used, and two or more types thereof may also be used in combination at any ratio.

As the polymerization reaction scheme, anionic polymerization may usually be adopted. Polymerization may be performed by any of bulk polymerization, solution polymerization, and the like. Among them, solution polymerization is preferable for continuously performing the polymerization reaction and the hydrogenation reaction.

Examples of the reaction solvent for use in polymerization may include aliphatic hydrocarbons, such as n-butane, n-pentane, isopentane, n-hexane, n-heptane, and isooctane; alicyclic hydrocarbons, such as cyclopentane, cyclohexane, methylcyclopentane, methylcyclohexane, and decalin; and aromatic hydrocarbons, such as benzene and toluene. Among these, it is preferable to use aliphatic hydrocarbons and alicyclic hydrocarbons because they can be used as an inert solvent also in the hydrogenation reaction.

As the reaction solvent, one type thereof may be solely used, and two or more types thereof may also be used in combination at any ratio.

The reaction solvent may be usually used in a ratio of 200 to 10,000 parts by weight relative to 100 parts by weight of the entire monomers.

A polymerization initiator is usually used in polymerization. Examples of the polymerization initiators may include a monoorganolithium such as n-butyllithium, sec-butyllithium, t-butyllithium, hexyllithium, and phenyllithium; and a polyfunctional organolithium compound such as dilithiomethane, 1,4-dilithiobutane, and 1,4-dilithio-2-ethylcyclohexane. As the polymerization initiator, one type thereof may be solely used, and two or more types thereof may also be used in combination at any ratio.

Examples of the production method when the polymer X is produced as a triblock copolymer containing the blocks A1 and A2 and the copolymer block B may include a production method including the following first to third steps. The material referred to herein as the "monomer composition" encompasses not only a mixture of two or more types of substances but also a material composed only of a single substance.

First step: step of polymerizing a monomer composition (a1) containing an aromatic vinyl compound to form the block A.

Second step: step of polymerizing a monomer composition containing an aromatic vinyl compound and a diene compound at one end of the resulting block A to form a copolymer block B, thereby forming an A-B diblock polymer.

Third step: step of polymerizing a monomer composition (a2) containing an aromatic vinyl compound at a terminal end of the resulting diblock polymer on the side of the copolymer block B to obtain a block copolymer. Here, the monomer composition (a1) and the monomer composition (a2) may be the same as or different from each other.

When each polymer block is polymerized, a polymerization accelerator and a randomizer may be used to prevent a chain sequence of a certain component from being excessively long in each block. When the polymerization is performed in a manner of anionic polymerization, for example, a Lewis base compound may be used as a randomizer. Specific examples of the Lewis base compound may include an ether compound such as dimethyl ether, diethyl ether, diisopropyl ether, dibutyl ether, tetrahydrofuran, diphenyl ether, ethylene glycol diethyl ether, and ethylene glycol methyl phenyl ether; a tertiary amine compound such as tetramethylethylenediamine, trimethylamine, triethylamine, and pyridine; an alkali metal alkoxide compound such as potassium t-amyloxide and potassium t-butyloxide; and a phosphine compound such as triphenylphosphine. One type thereof may be solely used, and two or more types thereof may also be used in combination at any ratio.

The polymerization temperature is not limited to a particular one as long as the polymerization reaction proceeds, and is usually 0° C. or higher, and preferably 20° C. or higher, and is usually 200° C. or lower, preferably 100° C. or lower, and more preferably 80° C. or lower.

After polymerization, if necessary, the polymer may be collected from the reaction mixture by any method. Examples of the collection methods may include a steam stripping method, a direct desolvation method, and an alcohol coagulation method. When a solvent inert to the hydrogenation reaction is used as the reaction solvent for polymerization, the polymerization solution as it is may be supplied to the hydrogenation process without collection of the polymer from the polymerization solution.

The method for hydrogenating the polymer is not particularly limited, and any method may be adopted. Hydrogenation may be performed, for example, using an appropriate hydrogenation catalyst. Specifically, hydrogenation may be performed in an organic solvent using a hydrogenation catalyst containing at least one metal selected from the group consisting of nickel, cobalt, iron, rhodium, palladium, platinum, ruthenium, and rhenium. The hydrogenation catalyst may be a heterogeneous or homogeneous catalyst. As the hydrogenation catalyst, one type thereof may be solely used, and two or more types thereof may also be used in combination at any ratio.

The heterogeneous catalyst may be used as metal or a metal compound itself or may be used in a state of being supported by an appropriate carrier. Examples of the carrier may include activated carbon, silica, alumina, calcium carbide, titania, magnesia, zirconia, diatomaceous earth, and silicon carbide. The supported amount of the catalyst in a carrier is usually 0.01% by weight or more, and preferably 0.05% by weight or more, and is usually 80% by weight or less, and preferably 60% by weight or less.

Examples of the homogenous catalysts may include a catalyst including a compound of nickel, cobalt or iron and an organometallic compound (for example, an organoaluminum compound and an organolithium compound) in combination; and an organometallic complex catalyst such as those including rhodium, palladium, platinum, ruthenium, and rhenium. Examples of the compound of nickel, cobalt or iron may include an acetyl acetone salt of these metals, a naphthenic acid salt of these metals, a cyclopentadienyl compound of these metals, and a cyclopentadienyl dichloro compound of these metals. Examples of the organoaluminum compound may include an alkylaluminum such as triethylaluminum and triisobutylaluminum; a halogenated aluminum such as diethylaluminum chloride and ethylaluminum dichloride; and a hydrogenated alkylaluminum such as diisobutylaluminum hydride.

Examples of the organometallic complex catalyst may include a γ-dichloro-π-benzene complex of the aforementioned respective metals, a dichloro-tris(triphenylphosphine) complex of the aforementioned respective metals, and a (hydride-chloro-triphenylphosphine) complex of the aforementioned respective metals.

The amount of the hydrogenation catalyst used relative to 100 parts by weight of the polymer is usually 0.01 parts by weight or more, preferably 0.05 parts by weight or more, and more preferably 0.1 parts by weight or more, and is usually 100 parts by weight or less, preferably 50 parts by weight or less, and more preferably 30 parts by weight or less.

The reaction temperature of the hydrogenation reaction is usually 10° C. to 250° C. From the viewpoint of achieving high hydrogenation rate and suppressing polymer chain cleavage reaction, the reaction temperature is preferably 50° C. or higher, and more preferably 80° C. or higher, and is preferably 200° C. or lower, and more preferably 180° C. or lower. The pressure during the reaction is usually 0.1 MPa to 30 MPa. From the viewpoint of operability in addition to the aforementioned viewpoint, the pressure is preferably 1 MPa or more, and more preferably 2 MPa or more, and is preferably 20 MPa or less, and more preferably 10 MPa or less.

The hydrogenation rate is usually 90% or higher, preferably 95% or higher, and more preferably 97% or higher. By such a high hydrogenation rate, low birefringence property and thermal stability of the vinyl alicyclic hydrocarbon polymer can be enhanced. The hydrogenation rate may be measured by $^1$H-NMR.

[5. Optional Component Other than Polymer X]

The optical film of the present invention may be composed only of the polymer X, or may contain an optional component other than the polymer X.

For example, the resin constituting the optical film of the present invention may contain an ultraviolet absorber in addition to the polymer X. The polymer X containing an ultraviolet absorber can impart ultraviolet resistance to the optical film of the present invention. In addition to this, since an ultraviolet shielding ability can be imparted to the optical film, other members can be protected from incoming ultraviolet rays that comes from the outside of the display device into the device through the display surface. Thus, when the optical film of the present invention is used as, for example, a protective film for a polarizing plate, the optical film of the present invention, and the polarizing plate that is protected by this film, as well as components such as a liquid crystal cell that are disposed at a farther position from the display surface than the polarizing plate in the display device, can be prevented from deterioration due to ultraviolet rays.

Examples of the ultraviolet absorbers may include a benzophenone-based ultraviolet absorber, a benzotriazole-based ultraviolet absorber, a triazine-based ultraviolet absorber, an acrylonitrile-based ultraviolet absorber, and a benzoate-based ultraviolet absorber. Among these, a benzotriazole-based ultraviolet absorber, a triazine-based ultraviolet absorber, a benzophenone-based ultraviolet absorber, and a benzoate-based ultraviolet absorber are preferable. In particular, suitable examples of the benzotriazole-based ultraviolet absorber for use may include 2,2'-methylenebis(4-(1,1,3,3-tetrametylbutyl)-6-(2H-benzotriazol-2-yl)phenol), 2-(2'-hydroxy-3'-tert-butyl-5'-methylphenyl)-5-chlorobenzotriazole, and 2,4-di-tert-butyl-6-(5-chlorobenzotriazol-2-yl)phenol; suitable examples of the benzophenone-based ultraviolet absorber for use may include 2,2'-dihydroxy-4,4'-dimethoxybenzophenone, and 2,2',4,4'-tetrahydroxybenzophenone; suitable examples of the triazine-based ultraviolet absorber for use may include 2-(4,6-diphenyl-1,3,5-triazin-2-yl)-5-[(hexyl)oxy]-phenol; and suitable examples of the benzoate-based ultraviolet absorber for use may include 2,4-di-tert-butyl-4-hydroxybenzoate. Among these, 2,2'-methylenebis(4-(1,1,3,3-tetrametylbutyl)-6-(2H-benzotriazol-2-yl)phenol) is particularly preferable. As the ultraviolet absorber, one type thereof may be solely used, and two or more types thereof may also be used in combination at any ratio.

The concentration of the ultraviolet absorber in the resin constituting the optical film of the present invention is preferably 0.5% by weight or more, and more preferably 1.0% by weight or more, and is preferably 8.0% by weight or less. When the concentration of the ultraviolet absorber is confined within the aforementioned range, the ultraviolet absorber can efficiently shield ultraviolet rays while it does not degrade the color of the optical film of the present invention.

Examples of the other optional components may include an inorganic fine particle, a stabilizer such as an antioxidant, a heat stabilizer, and a near-infrared absorber; a resin modifier such as a lubricant and a plasticizer, a colorant such as a dye and a pigment; and an antistatic agent. As the optional component, one type thereof may be solely used, and two or more types thereof may also be used in combination at any ratio. However, from the viewpoint of prominently exhibiting the advantageous effects of the present invention, the contents of the optional components are preferably low. For example, the ratio of the sum total of the optional components other than the ultraviolet absorber relative to 100 parts by weight of the polymer X is preferably 10 parts by weight or less, more preferably 5 parts by weight or less, and further preferably 3 parts by weight or less. In particular, it is preferable to contain no optional component other than the ultraviolet absorber.

[6. Size and Preferable Properties, Etc. of Optical Film]

The optical film of the present invention has a thickness of usually 10 μm or larger, preferably 15 μm or larger, and more preferably 20 μm or larger, and of usually 75 μm or smaller, preferably 50 μm or smaller, and more preferably 25 μm or smaller. When the thickness is equal to or more than the lower limit of the aforementioned range, breakage prevention ability and handleability of the polarizing plate during use of the optical film as a polarizing plate protective film can be improved. When the thickness is equal to or less than the upper limit, the polarizing plate can be made thin.

The optical film of the present invention preferably has a high impact strength. The term "impact strength" of a film herein represents a potential energy (mJ) of a steel ball. Specifically, a film is horizontally fixed to a jig that can support the film horizontally, and a steel ball (pachinko ball, weight: 5 g, diameter: 11 mm) is allowed to fall onto the center of the film fixed by the jig from various heights h. Then, the border height h is determined at which the film is broken or not, so that the positional energy (mJ) of the steel ball at that height h is determined. The impact strength of the optical film of the present invention may be preferably 14 mJ or more, and more preferably 15 mJ or more. The upper limit of the impact strength is not particularly limited, but may be, for example, 80 mJ or less. When the optical film has the high impact strength within the aforementioned range in addition to the above-described high tear strength, the optical film can have high durability whereby occurrence of defects can be avoided during the production process of display devices.

It is preferable that the optical film of the present invention has low phase difference expression property. The term "phase difference expression property" herein represents a degree of the phase difference expression when the film is stretched. Specifically, an optical film is subjected to free uniaxial stretching by a stretching ratio of 2 times at 135° C., and the Re of the stretched film is measured using a phase difference meter (for example, Axoscan manufactured by AXOMETRICS Inc.). The measured Re may be adopted as an index for the phase difference expression property. The Re of the stretched film is preferably 1 nm or less, and more preferably 0.7 nm or less. When the optical film has low phase difference expression property, display qualities of a display device to which the optical film is provided can be improved. The smaller the numerical value of the phase difference expression property is, the more the in-plane unevenness of phase difference due to stress generated during production process of a display device such as a bonding process is suppressed, so that the image display grade can be kept favorably. For example, even when a tension is applied to the optical film during production process of a display device, a phase difference exhibited thereby is small. Thus, the degree of imparting the unnecessary phase difference to the display device can be reduced.

The optical film of the present invention is usually a transparent layer to allow visible light to favorably pass therethrough. Specific light transmittance may be appropriately selected depending on the use application of the film of the present invention. For example, the light transmittance in a wavelength range of 420 to 780 nm is preferably 85% or more, and more preferably 88% or more. When the optical film of the present invention with such a high light transmittance is installed to a display device such as a liquid crystal display device, luminance deterioration after use in a long period of time can be particularly suppressed.

[7. Optional Layer]

The optical film of the present invention may include only one layer of the film formed from the resin containing the polymer X, and may also include two or more. The optical film of the present invention may include an optional layer in addition to the film formed from the resin containing the polymer X. Examples of the optional layer may include a matte layer for improving the film slidability, a hard coat layer such as a high impact resistant polymethacrylate resin layer, an antireflection layer, and an antifouling layer.

[8. Method for Producing Optical Film]

The method for producing the optical film of the present invention is not particularly limited, and any production method may be adopted. For example, a resin containing the polymer X is prepared and molded into a desired shape, to thereby produce the optical film of the present invention.

As the resin containing the polymer X, the polymer X prepared by the aforementioned method as it is may be used. If necessary, a mixture thereof with an optional component may also be used.

The method for molding the resin containing the polymer X is not particularly limited, and any molding method may be adopted. For example, any of a melt molding method and a solution casting method may be used. The melt molding method may be classified in detail into an extrusion molding method, a press molding method, an inflation molding method, an injection molding method, a blow molding method, and a stretch molding method. Among these methods, an extrusion molding method, an inflation molding method, and a press molding method are preferable for obtaining a film having an excellent mechanical strength and surface accuracy, etc. In particular, an extrusion molding method is preferable from the viewpoint of easy and efficient production of the film of the present invention while further reliably suppressing the expression of phase difference. The extrusion molding method can provide a long-length film. The long-length film refers to a film having a shape with the length being 5 or more times longer than the width, and preferably a film having a shape with the length being 10 or more times longer than the width. Specifically, the long-length film refers to a film long enough to be wound up into a rolled form and stored or transported. The upper limit of the ratio of the length relative to the width of the film is not particularly limited, but is, for example 100,000 or more times.

The resin molded in a film shape as it is may serve as the optical film of the present invention. Alternatively, the resin molded in a film shape may be subjected to a further optional treatment, and the resulting product may serve as the optical film of the present invention. Examples of such optional treatments may include a stretching treatment. When the ratio of the units constituting the polymer X is appropriately adjusted, the phase difference expression due to stretching in the resulting film can be suppressed. Thus, when such a stretching treatment is performed, an optical film having a small thickness, a large area, and favorable qualities can be easily produced.

The stretching conditions when performing such a stretching treatment are not particularly limited, and may be appropriately set so as to obtain a desired product. The stretching performed in the stretching treatment may be uniaxial stretching, biaxial stretching, or other stretching. The stretching direction may be set to any direction. For example, when the pre-stretch film is a long-length film, the stretching direction may be any of a lengthwise direction of the film, a widthwise direction thereof, and a diagonal direction other than the lengthwise and widthwise directions. When biaxial stretching is performed, an angle formed by the two stretching directions may be usually an angle at which the directions are orthogonal to each other. However, the angle is not limited thereto, and may be any angle. Biaxial stretching may be sequential biaxial stretching or simultaneous biaxial stretching. From the viewpoint of higher productivity, simultaneous biaxial stretching is preferable.

The stretching ratio when performing the stretching treatment may be appropriately adjusted in accordance with the desired conditions. For example, the stretching ratio is preferably 1.5 times or more, and more preferably 2 times or more, and is preferably 5 times or less, and more preferably 3 times or less. When biaxial stretching is performed, the stretching ratio in each of the two stretching directions may be set within this range. When the stretching ratio is within the aforementioned range, the optical film with high qualities can be efficiently produced. The stretching temperature may be Tg−5(° C.) to Tg+20(° C.) relative to the glass transition temperature Tg of the resin containing the polymer X.

[9. Use Application of Optical Film: Polarizing Plate]

The optical film of the present invention has properties such as high heat resistance, low water vapor transmission rate, and low |Re| and |Rth|. Thus, the optical film may be suitably used as a protective film for protecting other layers in a display device such as a liquid crystal display device. In particular, the protective film of the present invention can favorably exhibit its function in particular as a polarizer protective film.

The polarizing plate of the present invention includes the aforementioned optical film of the present invention and a polarizer layer. In the polarizing plate of the present invention, the optical film can function as the polarizer protective film. The polarizing plate of the present invention may further include an adhesive layer in between the optical film and the polarizer layer, for bonding them.

The polarizer layer is not particularly limited, and may be any known polarizer layer. Examples of the polarizer may include those obtained by allowing a polyvinyl alcohol film to adsorb a material such as iodine or a dichroic dye followed by stretching. Examples of the adhesive constituting the adhesive layer may include those formed from various polymers as a base polymer. Examples of the base polymer may include an acrylic polymer, a silicone polymer, polyester, polyurethane, polyether, and synthetic rubber.

The numbers of the polarizer layer and the protective film layer provided to the polarizing plate of the present invention may be any numbers. The polarizing plate of the present invention may usually include one polarizer layer and two protective films provided to both sides of the polarizer layer. Among such two protective film layers, both of or either one of them may be of the optical film of the present invention. In particular, in a liquid crystal display device including a light source and a liquid crystal cell and further having polarizing plates on both the light source side and display surface side of the liquid crystal cell, it is particularly preferable to use the optical film of the present invention as the protective film used at the position closer to the light source than the polarizer on the display surface side. When such a configuration is provided to the liquid crystal display device, it is possible to easily configure the liquid crystal display device having favorable display qualities and durability by taking advantage of the properties such as high heat resistance, low water vapor transmission rate, and low |Re| and |Rth|.

EXAMPLES

Hereinafter, the present invention will be described in detail by way of Examples. However, the present invention is not limited to the following Examples and may be embodied with any modifications without departing from the scope of the claims of the present invention and equivalents thereto.

In the following description, "%" and "part" expressing an amount are on the basis of weight unless otherwise stated. The operations described below were performed under conditions of normal temperature and normal pressure in atmospheric air unless otherwise stated.

[Evaluation Methods]

(Molecular Weight)

The weight-average molecular weight and the number-average molecular weight of polymers (polymer X and polymers as intermediate products during the production of the polymer X) were measured at 38° C. as standard polystyrene-equivalent values by GPC using THF as an eluting solvent. As the measurement device, HLC8020GPC manufactured by Tosoh Corporation was used.

(Tear Strength)

The tear strength of an optical film was evaluated in accordance with a trouser tear test (JIS K7128-1). The test speed was 200 mm/min±10%.

(Impact Strength)

The optical films obtained in Examples and Comparative Examples were each horizontally fixed to a jig that can support the film horizontally. A steel ball (pachinko ball, weight: 5 g, diameter: 11 mm) was allowed to fall onto the center of the film fixed by the jig from various heights h. Then, the border height h was determined at which the film was broken or not, and the positional energy (mJ) of the steel ball at that height h was adopted as the impact strength.

(Heat Resistance)

The optical films obtained in Examples and Comparative Examples were each cut out to obtain a sample having a shape of 5 mm×20 mm. The temperature was changed in TMA (thermomechanical analysis) measurement while a tension of 50 mN was applied to the sample in its lengthwise direction. The temperature change was temperature elevation at 5° C./min. The temperature at which the linear expansion of the film was changed by 5% was evaluated as an index of heat resistance.

(Re and Rth)

The long-length optical films obtained in Examples and Comparative Examples were measured using a phase difference meter (Product name: Axoscan, manufactured by AXOMETRICS Inc.) to determine Re and Rth at the wavelength of 590 nm.

(Phase Difference Expression Property)

The long-length optical films obtained in Examples and Comparative Examples were subjected to free uniaxial stretching in the lengthwise direction of the long-length film using a drawing tester (manufactured by Instron Corp.) by a stretching ratio of 2 times at 135° C. The resulting stretched film was measured using a phase difference meter (Product name: Axoscan, manufactured by AXOMETRICS Inc.) to determine Re at a wavelength of 590 nm. The Re value of the stretched film was divided by the thickness of the stretched film to convert it to a value per 1 nm of the film thickness. This value was adopted as an index for evaluating the phase difference expression property.

(Water Vapor Transmission Rate)

Water vapor transmission rates of the optical films obtained in Examples and Comparative Examples were measured using a water vapor transmission measurement device ("PERMATRAN-W" manufactured by MOCON Inc.) in accordance with JIS K 7129 B-1992 under the conditions of temperature of 40° C. and humidity of 90% RH. The detection limit of this measurement device is 0.01 g/(m²·day).

Example 1

(1-1. Polymerization Reaction of First Stage: Extension of Block A1)

In a stainless-steel reaction vessel equipped with a stirrer, inside of which was sufficiently dried and replaced with nitrogen, 320 parts of dehydrated cyclohexane, 55 parts of styrene, and 0.38 parts of dibutyl ether were charged. 0.41 Parts of an n-butyllithium solution (content 15% by weight in hexane solution) was added to the mixture while being stirred at 60° C., to thereby initiate and perform a polymerization reaction in the first stage. At 1 hour after the initiation of the reaction, the reaction mixture was sampled to analyze by a gas chromatography (GC). As a result, the polymerization conversion rate was found to be 99.5%.

(1-2. Reaction of Second Stage: Extension of Block B)

To the reaction mixture obtained in (1-1), 40 parts of a mixed monomer containing 20 parts of styrene and 20 parts of isoprene was added, to initiate a subsequent polymerization reaction in the second stage. At 1 hour after the initiation of the polymerization reaction in the second stage, the reaction mixture was sampled to analyze by GC. As a result, the polymerization conversion rate was found to be 99.5%.

(1-3. Reaction of Third Stage: Extension of Block A2)

To the reaction mixture obtained in (1-2), 5 parts of styrene was added, to initiate a subsequent polymerization reaction in the third stage. At 1 hour after the initiation of the polymerization reaction in the third stage, the reaction mixture was sampled to measure the weight-average molecular weight Mw and the number-average molecular weight Mn of the polymer. In addition, the sampled mixture was analyzed by GC. As a result, the polymerization conversion rate was found to be almost 100%. Immediately after the confirmation, 0.2 parts of isopropyl alcohol was added to the reaction mixture to terminate the reaction. In this manner, a mixture containing the polymer X having a triblock molecular structure of A1-B-A2 was obtained.

Since the polymerization reactions in (1-1) and (1-2) were allowed to sufficiently proceed, it is considered that the polymerization conversion rate was almost 100%, and therefore the weight ratio of St/Ip in the block B was 20/20.

On the basis of these values, it was found that the resulting polymer X was a polymer having a triblock molecular structure of St–(St/Ip)–St=55–(20/20)–5. The weight-average molecular weight (Mw) and the molecular weight distribution (Mw/Mn) of the polymer X were 105,500 and 1.04, respectively.

The mixture containing the aforementioned polymer X was transferred to a pressure resistant reaction vessel equipped with a stirrer. 8.0 Parts of a diatomaceous earth supported-type nickel catalyst (product name "E22U", the amount of nickel supported: 60%, manufactured by JGC Catalyst and Chemicals Ltd.) as a hydrogenation catalyst and 100 parts of dehydrated cyclohexane were added and mixed. Inside air of the reaction vessel was replaced with a hydrogen gas, and hydrogen was supplied to the solution while the solution was stirred, to thereby perform a hydrogenation reaction at temperature of 190° C. and pressure of 4.5 MPa for 6 hours. The weight-average molecular weight (Mw) and the molecular weight distribution (Mw/Mn) of the hydrogenated product of the polymer X contained in the reaction solution obtained by the hydrogenation reaction were 111,800 and 1.05, respectively.

After the hydrogenation reaction was completed, the reaction solution was filtrated to remove the hydrogenation catalyst. 2.0 parts of a xylene solution in which 0.1 parts of pentaerythrityl·tetrakis[3-(3,5-di-t-butyl-4-hydroxyphenyl)propionate] (product name "Songnox1010" manufactured by Songwon Industrial Co., Ltd.) that is a phenol-based antioxidant had been dissolved was added thereto to dissolve therein.

Then, the solution was processed using a cylindrical concentration dryer (product name "Kontro" manufactured by Hitachi Ltd.) at temperature of 260° C. and pressure of 0.001 MPa or lower, to remove the solvent cyclohexane, xylene, and other volatile components from the aforementioned solution. The molten polymer was extruded through a die in a strand shape, cooled, and prepared by a pelletizer into 95 parts of pellets of the hydrogenated product of the polymer X.

The weight-average molecular weight (Mw) and the molecular weight distribution (Mw/Mn) of the hydrogenated product of the polymer X obtained in a pellet shape were 110,300 and 1.10, respectively. The hydrogenation rate was almost 100%.

(1-4. Production of Optical Film)

The pellets of the hydrogenated product of the polymer X obtained in (1-3) were extruded to obtain a long-length optical film having a thickness of 50 μm. The tear strength, impact strength, heat resistance, Re, Rth, phase difference expression property, and water vapor transmission rate of the resulting optical film were measured.

Example 2

An optical film was obtained and evaluated in the same manner as that in Example 1 except that the operation was changed as follows.
  The use amount of styrene in the polymerization reaction in the first stage of (1-1) was changed from 55 parts to 65 parts.
  30 Parts of a mixed monomer containing 15 parts of styrene and 15 parts of isoprene was used in place of 40 parts of the mixed monomer containing 20 parts of styrene and 20 parts of isoprene in the polymerization reaction in the second stage of (1-2).

Example 3

An optical film was obtained and evaluated in the same manner as that in Example 1 except that the operation was changed as follows.
  The use amount of styrene in the polymerization reaction in the first stage of (1-1) was changed from 55 parts to 45 parts.
  50 Parts of a mixed monomer containing 25 parts of styrene and 25 parts of isoprene was used in place of 40 parts of the mixed monomer containing 20 parts of styrene and 20 parts of isoprene in the polymerization reaction in the second stage of (1-2).

Example 4

An optical film was obtained and evaluated in the same manner as that in Example 1 except that the operation was changed as follows.
  The amount of the n-butyllithium solution (content 15% by weight in hexane solution) in the polymerization reaction in the first stage of (1-1) was changed from 0.41 parts to 0.56 parts.

Comparative Example 1

An optical film was obtained and evaluated in the same manner as that in Example 1 except that the operation was changed as follows.
  The use amount of styrene in the polymerization reaction in the first stage of (1-1) was changed from 55 parts to 30 parts.
  The use amount of styrene in the polymerization reaction in the third stage of (1-3) was changed from 5 parts to 30 parts.

Comparative Example 2

An optical film was obtained and evaluated in the same manner as that in Example 1 except that the operation was changed as follows.
  The use amount of styrene in the polymerization reaction in the first stage of (1-1) was changed from 55 parts to 20 parts.
  60 Parts of a mixed monomer containing 30 parts of styrene and 30 parts of isoprene was used in place of 40 parts of the mixed monomer containing 20 parts of styrene and 20 parts of isoprene in the polymerization reaction in the second stage of (1-2).
  The use amount of styrene in the polymerization reaction in the third stage of (1-3) was changed from 5 parts to 20 parts.

Comparative Example 3

An optical film was obtained and evaluated in the same manner as that in Example 1 except that the operation was changed as follows.
  The amount of the n-butyllithium solution (content 15% by weight in hexane solution) in the polymerization reaction in the first stage of (1-1) was changed from 0.41 parts to 0.90 parts.

Comparative Example 4

An optical film was obtained and evaluated in the same manner as that in Example 1 except that the operation was changed as follows.
  The use amount of styrene in the polymerization reaction in the first stage of (1-1) was changed from 55 parts to 60 parts.
  24 Parts of a mixed monomer containing 12 parts of styrene and 12 parts of isoprene was used in place of 40 parts of the mixed monomer containing 20 parts of styrene and 20 parts of isoprene in the polymerization reaction in the second stage of (1-2).
  The use amount of styrene in the polymerization reaction in the third stage of (1-3) was changed from 5 parts to 16 parts.

The results of Examples and Comparative Examples are shown in Table 1 and Table 2.

TABLE 1

|  | Ex. 1 | Ex. 2 | Ex. 3 | Ex. 4 |
|---|---|---|---|---|
| Molecular structure | St-(St/Ip)-St = 55-(20/20)-5 | St-(St/Ip)-St = 65-(15/15)-5 | St-(St/Ip)-St = 45-(25/25)-5 | St-(St/Ip)-St = 55-(20/20)-5 |
| (a)/(b) | 80/20 | 85/15 | 75/25 | 80/20 |
| A1/A2 | 55/5 | 65/5 | 45/5 | 55/5 |
| Mw | 110,300 | 111,500 | 109,900 | 81,000 |
| Mw/Mn | 1.10 | 1.13 | 1.09 | 1.06 |
| Tear strength (N/mm) | 1.71 | 1.61 | 2 | 1.65 |

TABLE 1-continued

|  | Ex. 1 | Ex. 2 | Ex. 3 | Ex. 4 |
|---|---|---|---|---|
| Impact strength (mJ) | 16.2 | 14.3 | 18.5 | 15.5 |
| Heat resistance (° C.) | 135 | 140 | 125 | 125 |
| Re (nm) | 0.5 | 0.7 | 0.5 | 0.5 |
| Rth (nm) | 0.8 | −0.9 | 0.8 | 0.9 |
| Phase difference expression property (nm, converted to 1 nm thickness) | 0.000015 | 0.000019 | 0.000016 | 0.000016 |
| Water vapor transmission rate g/m2 · day | 8 | 8 | 8 | 8 |

TABLE 2

|  | Comp. Ex. 1 | Comp. Ex. 2 | Comp. Ex. 3 | Comp. Ex. 4 |
|---|---|---|---|---|
| Molecular structure | St-(St/Ip)-St = 30-(20/20)-30 | St-(St/Ip)-St = 20-(30/30)-20 | St-(St/Ip)-St = 55-(20/20)-5 | St-(St/Ip)-St = 60-(12/12)-16 |
| (a)/(b) | 80/20 | 60/40 | 80/20 | 88/12 |
| A1/A2 | 30/30 | 20/20 | 55/5 | 60/16 |
| Mw | 111,000 | 109,200 | 50,400 | 111,900 |
| Mw/Mn | 1.09 | 1.08 | 1.05 | 1.13 |
| Tear strength (N/mm) | 1.5 | 1.6 | 0.9 | 1 |
| Impact strength (mJ) | 15.3 | 18.4 | 13 | 7 |
| Heat resistance (° C.) | 105 | 85 | 108 | 140 |
| Re (nm) | 0.5 | 1.5 | 0.5 | 1.2 |
| Rth (nm) | 0.8 | 2 | 0.8 | −1.7 |
| Phase difference expression property (nm, converted to 1 nm thickness) | 0.000016 | 0.00004 | 0.000015 | 0.000045 |
| Water vapor transmission rate g/m2 · day | 8 | 8 | 8 | 8 |

The representation such as St-(St/Ip)-St=55-(20/20)-5 in Examples of the present application shows a weight ratio of the styrene hydrogenated product unit and the isoprene hydrogenated product unit in the block A1, the copolymer block B, and the block A2. For example, "St-(St/Ip)-St=55-(20/20)-5" shows that the weight ratio of the styrene hydrogenated product unit in the block A1, the styrene hydrogenated product unit in the copolymer block B, the isoprene hydrogenated product unit in the copolymer block B, and the styrene hydrogenated product unit in the block A2 is 55:20:20:5.

The optical films obtained in Examples 1 to 4 have the high tear strength, high impact strength, high heat resistance, low |Re|, low |Rth|, low phase difference expression property, and low water vapor transmission rate. Thus, the optical films can be advantageously used as a protective film for protecting a polarizer in a polarizing plate. In particular, such an optical film can be suitably used in a liquid crystal display device including a light source and a liquid crystal cell and further having polarizing plates disposed on both the light source and display surface sides of the liquid crystal cell, as a protective film to be located at a position closer to the light source than the polarizer on the display surface side.

The invention claimed is:

1. An optical film having a heat resistance of 120° C. or higher, a tear strength of 1.5 N/mm or more, a water vapor transmission rate of 50 g/m$^2$·day or less, and having absolute values |Re| and |Rth| an in-plane retardation Re and a thickness-direction retardation Rth each being 1 nm or less, the film comprising a polymer having a unit (a) of a hydrogenated product of an aromatic vinyl compound and a unit (b) of a hydrogenated product of a diene compound, wherein the polymer contains:
blocks A1 and A2 each having the unit (a) of the hydrogenated product of the aromatic vinyl compound; and
a copolymer block B having the unit (a) of the hydrogenated product of the aromatic vinyl compound and the unit (b) of the hydrogenated product of the diene compound,
the polymer has a triblock molecular structure having one per one molecule of the copolymer block B, one per one molecule of the block A1, and one per one molecule of the block A2, the blocks A1 and A2 being bonded to respective ends of the copolymer block B,
a weight ratio (a)/(b) of the unit (a) of the hydrogenated product of the aromatic vinyl compound to the unit (b) of the hydrogenated product of the diene compound in the polymer is in a range of 75/25 to 80/20,
a weight ratio A1/A2 of the block A1 to the block A2 is in a range of 40/5 to 60/5, and
the polymer has a molecular weight of 90,000 to 130,000.

2. The optical film according to claim 1, wherein
the unit (a) of the hydrogenated product of the aromatic vinyl compound is a unit obtained by polymerizing and hydrogenating styrene, and
the unit (b) of the hydrogenated product of the diene compound is a unit obtained by polymerizing and hydrogenating isoprene.

3. A polarizing plate comprising: the optical film according to claim 1; and a polarizer layer.

4. The optical film according to claim 1, having a thickness of 50 μm or less.

5. A polarizing plate comprising: the optical film according to claim 4; and a polarizer layer.

* * * * *